United States Patent [19]

Asanuma et al.

[11] Patent Number: 5,172,315
[45] Date of Patent: Dec. 15, 1992

[54] AUTOMATIC TRAVELLING APPARATUS AND METHOD

[75] Inventors: Nobuyoshi Asanuma; Shinnosuke Ishida; Hiroshi Hasegawa, all of Saitama, Japan

[73] Assignee: Honda Giken Kogyo Kabushiki Kaisha, Tokyo, Japan

[21] Appl. No.: 873,648

[22] Filed: Apr. 23, 1992

Related U.S. Application Data

[63] Continuation of Ser. No. 758,437, Sep. 4, 1991, abandoned, which is a continuation of Ser. No. 392,195, Aug. 10, 1989, abandoned.

[30] Foreign Application Priority Data

Aug. 10, 1988 [JP] Japan ................................. 63-199610

[51] Int. Cl.$^5$ .............................................. G06F 15/50
[52] U.S. Cl. .................................. 364/424.02; 180/169
[58] Field of Search ....................... 364/424.01, 424.02; 180/167–169; 358/103

[56] References Cited

U.S. PATENT DOCUMENTS

| | | | |
|---|---|---|---|
| 4,530,057 | 7/1985 | Ahlbonn | 364/424.02 |
| 4,630,109 | 12/1986 | Barton | 364/424.02 |
| 4,731,860 | 3/1988 | Wahl | 382/41 |
| 4,821,192 | 4/1989 | Taivalkoski et al. | 364/424.02 |
| 4,970,653 | 11/1990 | Kenue | 364/461 |

FOREIGN PATENT DOCUMENTS 62-24310 1/1987 Japan.

OTHER PUBLICATIONS

"Road Boundary Detection for Autonomous Vehicle Navigation", by Larry S. Davis et al., Optical Engineering, Mar. 1986.
"Image Processing for Visible Navigation of Roadways", by Jacqueline Le Moigne et al, Jul. 1985.

Primary Examiner—Thomas G. Black
Attorney, Agent, or Firm—Lyon & Lyon

[57] ABSTRACT

An automatic travelling apparatus which is capable of finding out a permissible travelling area from images taken by an image pick-up device to set a target course in the permissible travelling area; determining a steering amount appropriate for the purpose of permitting the vehicle to put itself on the target course, in consideration of the instantaneous travelling condition of the vehicle; and performing the exact steering control in terms of the steering amount. The exact travelling attained by the automatic travelling apparatus according to the present invention is attributable to a two-step determination in which first, a target course is set in a permissible area, and a tentative course is set appropriate for the purpose of permitting the vehicle to put itself on the target course.

11 Claims, 7 Drawing Sheets

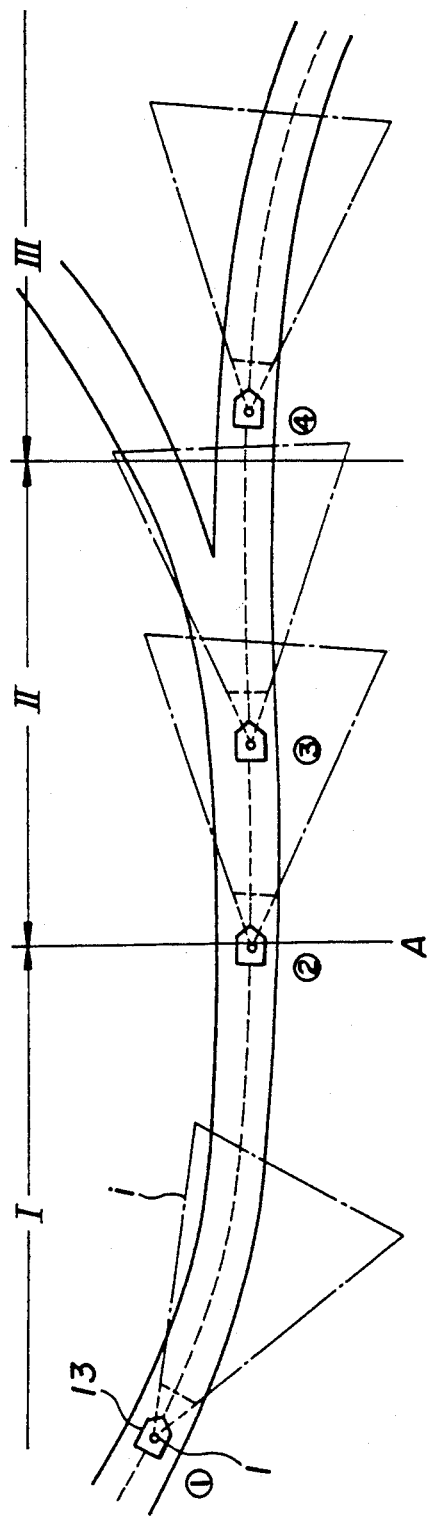
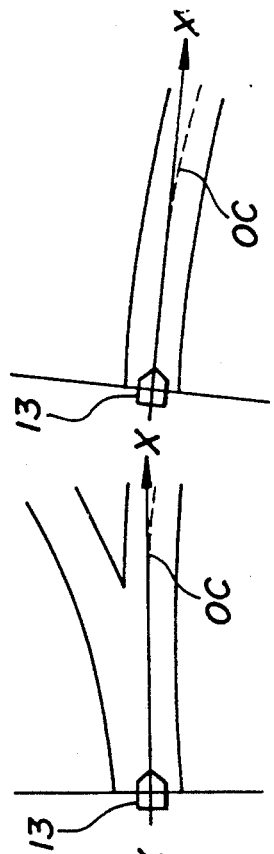
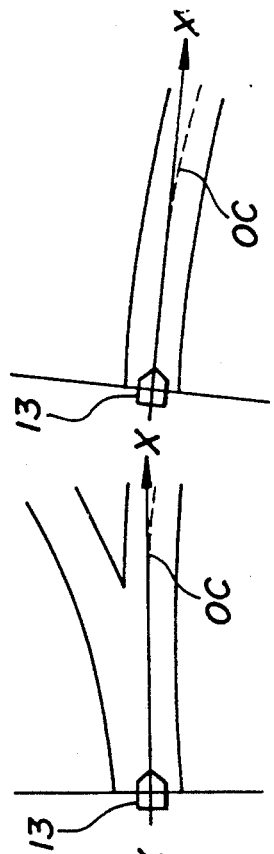
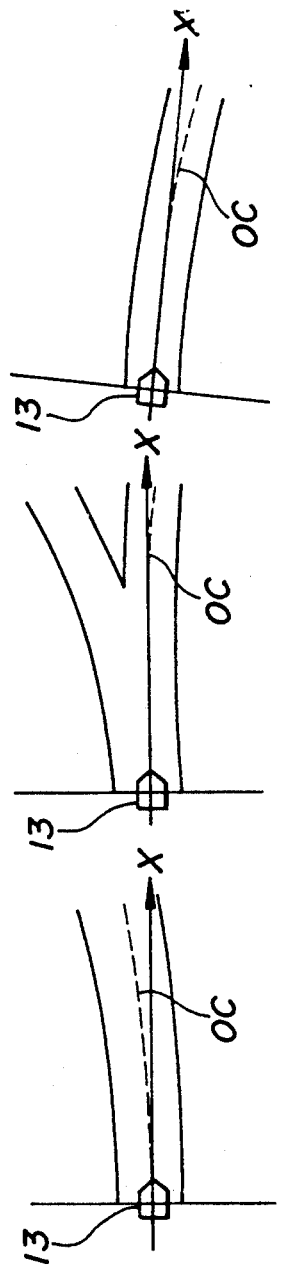
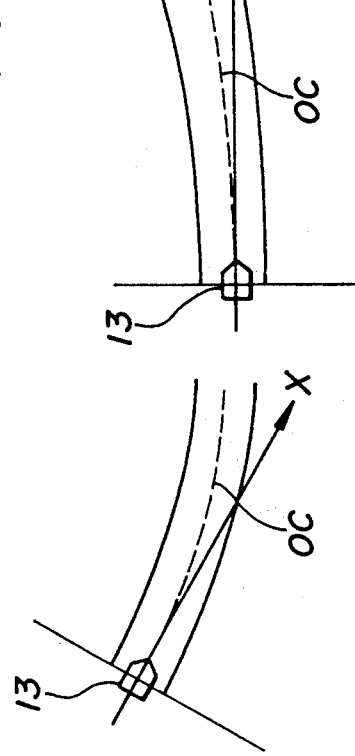

AUTOMATIC TRAVELLING APPARATUS AND METHOD

This is a continuation of co-pending application Ser. No. 07/758,437, filed on Sep. 4, 1991, now abandoned, Which is a continuation of application Ser. No. 392,195 filed on Aug. 10, 1989, now abandoned.

BACKGROUND OF THE INVENTION

1. Field of the Invention

The present invention relates to automatic travelling apparatus and method in which a vehicle determines a path to follow on road.

2. Description of the Prior Art

A conventional automatic travelling system uses an image pickup device attached to a vehicle to steer the vehicle, thereby permitting it to follow a guide line which is laid on the road (See Japanese Patent Publication No. 58-42482 and Japanese Patent Application Public Disclosure No. 62-140109).

Apparently, such an automatic travelling system is useless on the road having no guide line.

Another example of automatic travelling system is an automatic power lawn mower equipped with an image pickup device such as a video camera. While continuously taking images of the lawn area ahead of the mower, these images are treated to enhance the difference of shade between the finished and unfinished areas, thereby permitting exact detection of the boundary between the finished and unfinished areas. The mower is steered to travel along the boundary thus detected (See Japanese Patent Application Public Disclosure No. 62-70916).

This automatic travelling system is capable of determining a course to follow, but this automatic travelling system is essentially the same as the first automatic travelling system described above in respect of that the vehicle follows a single guide line on the road.

When a vehicle is running on the road, an appropriate path to follow on the road should be determined by taking the width of the road and the running speed of the vehicle into consideration.

SUMMARY OF THE INVENTION

One object of the present invention is to provide an automatic travelling apparatus which is capable of automatically determining an appropriate course in the road and steering the vehicle to follow the course thus determined.

Another object of the present invention is to provide an automatic travelling method which permits automatic determination of an appropriate course in the road and steerage of the vehicle.

To attain these objects an automatic travelling apparatus according to the present invention comprises: an image pickup device or video camera attached to a vehicle; means for determining a permissible travelling area on the basis of images taken by the image pickup device; means for setting a target course in the permissible travelling area thus determined; means for detecting the instantaneous running condition of the vehicle; means for estimating, on the basis of the instantaneous running condition, a steering amount to permit the vehicle to follow the target course; and means for steering the vehicle with reference to the steering amount. An automatic travelling method according to the present invention comprises the steps of: taking images of the extension of road ahead of a vehicle; determining a permissible travelling area on the basis of the images thus taken; setting a target course in the permissible travelling area thus determined; detecting the instantaneous running condition of the vehicle; estimating, on the basis of the instantaneous running condition, a steering amount to permit the vehicle to follow the target course; and steering the vehicle with reference to the steering amount.

Other objects and advantages of the present invention will be understood from the following description of an automatic travelling apparatus according to a preferred embodiment of the present invention which is shown in accompanying drawings:

FIG. 9 shows the manner in which a vehicle is travelling toward a Y-branch;

Figure 11:
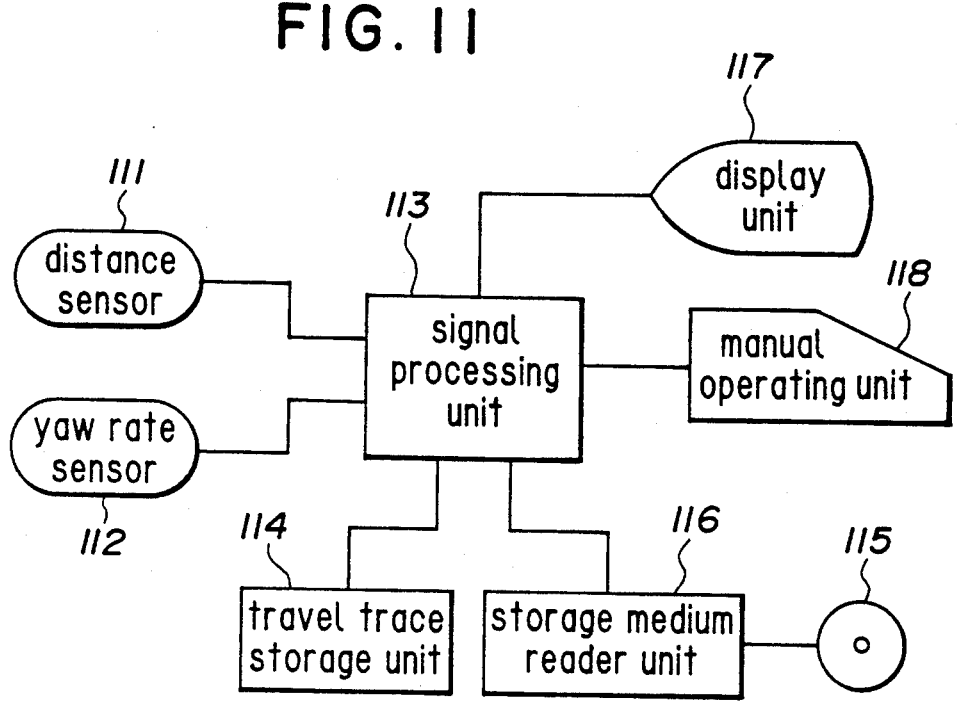
Figure 12:
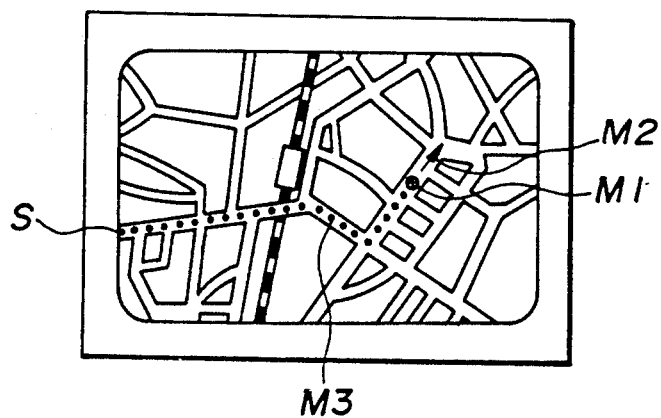
Figure 13:
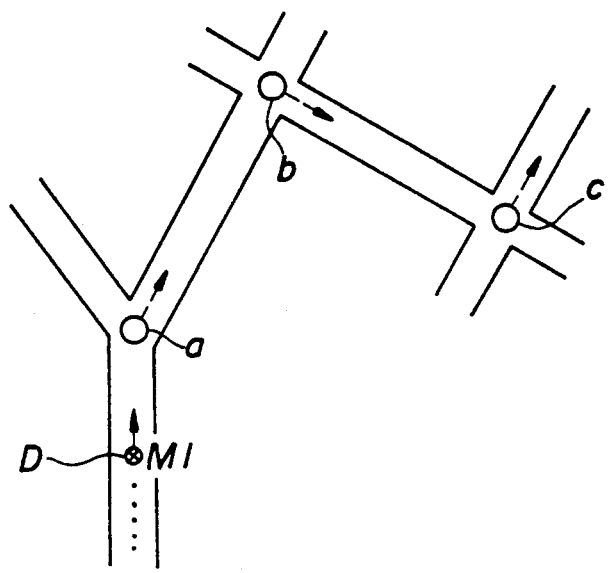
Figure 14:
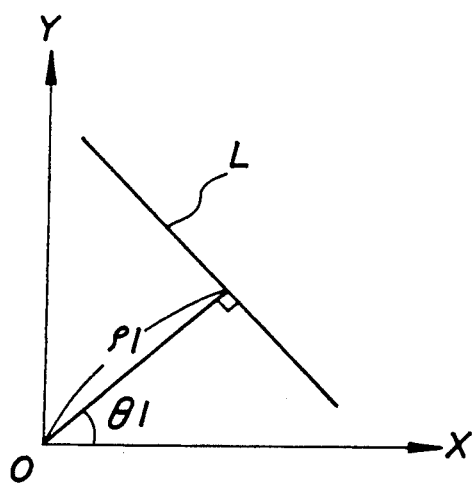

FIGS. 10(a) to 10(d) show different travelling controls in different sections corresponding to those of FIG. 9;

FIG. 11 is a block diagram showing a travelling system;

FIG. 12 shows one example of image appearing on the screen of a display unit;

FIG. 13 shows what marks appear on the screen of the display unit when travelling commands are inputted;

FIG. 14 shows a line L appearing in the X-Y coordinates; and

Figure 15:
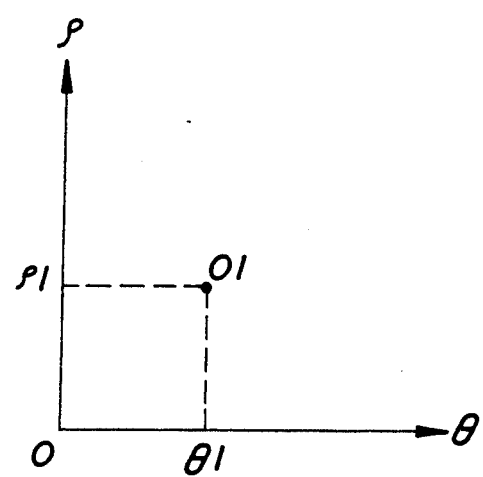

FIG. 15 shows a point appearing on the $\rho$-$\theta$ coordinates when the line L in FIG. 14 is subjected to the Hough conversion.

Figure 1:
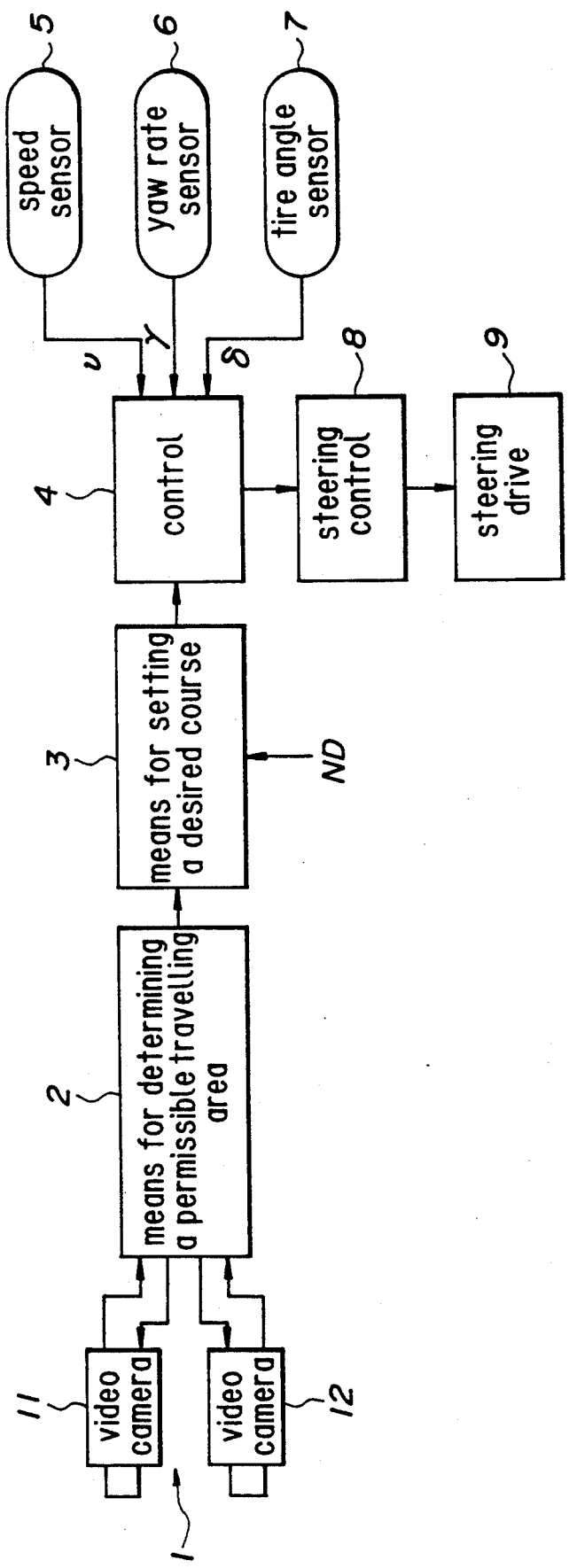
FIG. 1 is a block diagram of an automatic travelling apparatus according to one embodiment of the present invention.

As shown in FIG. 1, an automatic travelling apparatus according to the present invention comprises: an image pickup device such as video cameras $1_1$ and $1_2$ attached to a vehicle for continuously picking up subsequent images of ground ahead of the vehicle; means 2 for processing the images taken by the video cameras and determining a permissible travelling area such as a road in the direction in which the vehicle is to travel; means 3 for setting a target course in the permissible travelling area thus determined; means 4 for determining the instantaneous running condition of the vehicle on the basis of an output signal from a speed sensor 5 representing the running speed "v" of the vehicle, an output signal from a yaw rate sensor 6 representing the yaw rate or angular velocity increment in yawing direction, and an output signal from a tire angle sensor 7 representing the tire angle $\delta$ which varies with the steering of the vehicle, and for estimating, on the basis of the instantaneous running condition, a steering amount to permit the vehicle to follow the target course; and means 8 (and a steerage drive 9) for steering the vehicle with reference to the steering amount.

Actually, a computor aided control is used in place of means 2, 3 and 4, and means 8 can be included in the computor aided control, if occasions demand.

Figure 2:
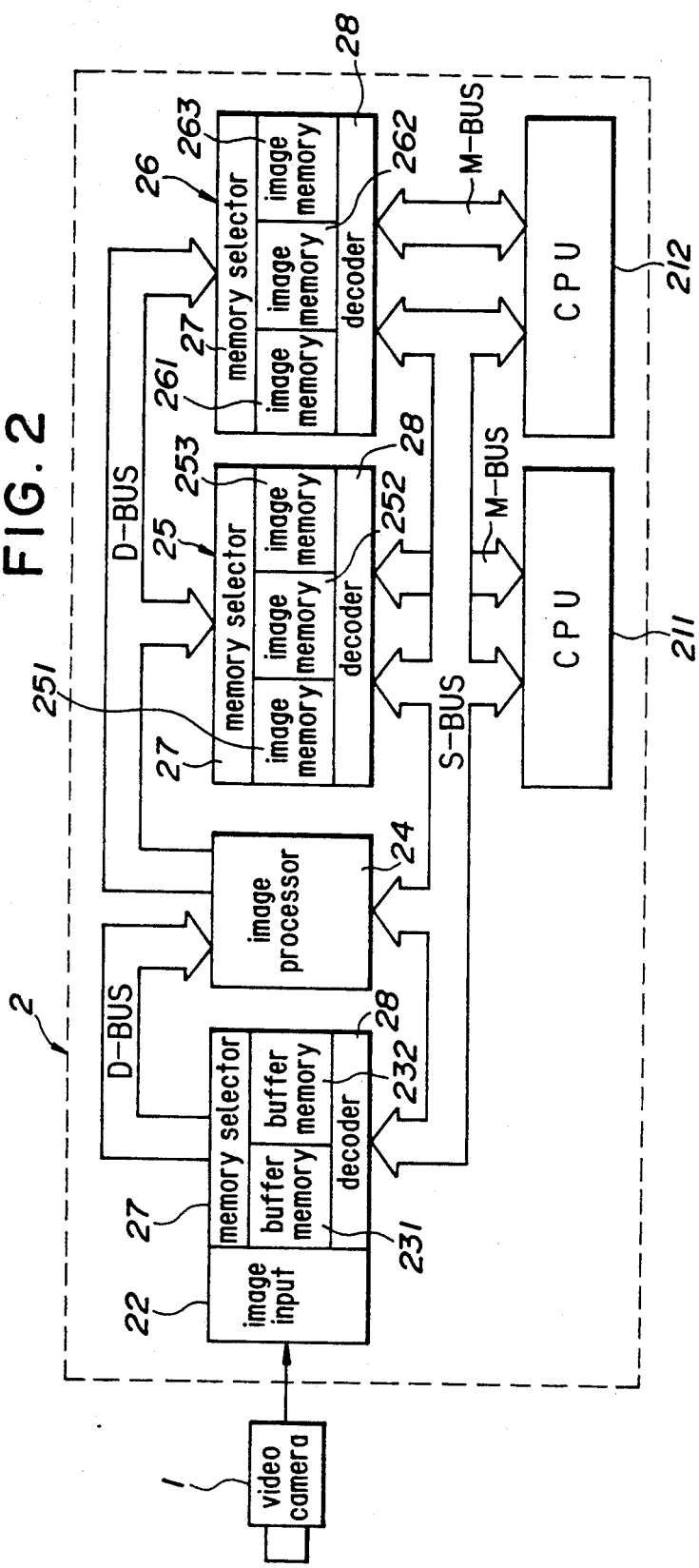
FIG. 2 is a block diagram of permissible area determining means.

FIG. 2 shows the structure of the permissible travelling area determining means 2 as comprising: first stage including image input 22, buffer memories $23_1$, $23_2$, memory selector 27 and decoder 28; second stage including image processor 24 connected to memory selector 27 of the first stage via D-bus (high-speed data bus); third stage including memory selector 25, image memories $25_1$, $25_2$ and $25_3$ and decoder 28; fourth stage including memory selector 27, image memories $26_1$, $26_2$ and $26_3$ and decoder 28, memory selectors 25 and 26 of the third and fourth stages being connected to the image processor 24 via D-bus; first and second CPUs 211 and 212 both connected to decorders 28 of the first, third and fourth stages via S-bus (system bus) and connected to decorders 28 of the third and fourth stages via M-bus (high-speed memory access bus).

In operation a series of image signals each representing a single image are supplied from the video cameras $1_1$, $1_2$ to the image input of the first stage, and then these image signals are stored alternately in the buffer memories $23_1$ and $23_2$ under the control of the CPUs 211 and 212. Then, these image informations are shifted to the image processor 24 one after another, where they are subjected to image processing, thereby detecting road edges in images if any, and determining a permissible travelling area as later described in detail. The image informations pertaining to permissible travelling areas are supplied to a group of image memories $25_1$, $25_2$ and $25_3$ or a group of image memories $26_1$, $26_2$ and $26_3$. Then, the contents of these memories are renewed by these latest image informations pertaining to permissible travelling areas. Thus, a series of image informations pertaining to subsequent permissible travelling areas, over a predetermined distance which the vehicle runs, are stored in either memory group. The contents of either memory group 25 or 26 are transfered to means 3 for setting a target course in the permissible travelling area.

Parallel installations of two CPUs 211 and 212 and two buffer memories 231 and 232 permit alternate retrieval or storage of image information to either buffer memory, as for example follows: while first image information stored in the buffer memory 231 are read under the control of the CPU 211, subsequent image information are stored in the buffer memory 232 under the control of the CPU 212. Thus, the inputting of image information can be carried out on the real time basis.

Likewise, parallel installation of two groups of image memories 25 and 26 permit alternate retrieval or storage of image information to either memory group on the real time basis.

The determination of a permissible travelling area can be made as follows:

First, each image supplied from the video cameras will be subjected to differentiation process, and road edges if any, will be detected. Then, an automatic threshold setting circuit in the permissible travelling area detection means 2 sets a threshold value in consideration of road the degree of shade of the image information just processed. The road edge image will be subjected to binary transformation.

Alternately, first, the images may be subjected to binary transformation, and then the binary data may be subjected to differentiation. In place of binary transformation poly-digitization may be performed to express some shade details of image.

Figure 3:
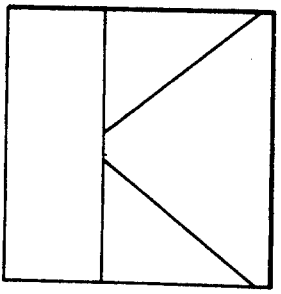
FIG. 3 shows one example of road determined from images taken by a video camera of a vehicle.

The digitalized image information will be subjected to the Hough conversion (such as suggested in U.S. Pat. No. 3,069,654, Paul V. C. Hough, inventor) to convert the X-Y linear coordinates to the corresponding $\rho$-$\theta$ point coordinates, thus eliminating isolated points and plotting to provide a continuous road edge image as shown in FIG. 3.

$\theta$ stands for an angle formed between the X-axis and a normal line extending from the origin of the X-Y coordinates perpendicular to the line, whereas $\rho$ stands for the length of the normal line. For instance, the line L in the X-Y coordinates in FIG. 14 is expressed as the point 01 in the $\rho$-$\theta$ point coordinates in FIG. 15.

Figure 4:
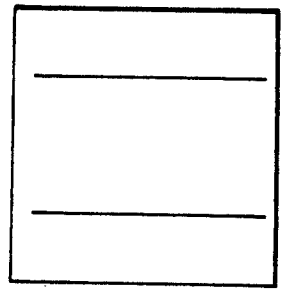
FIG. 4 shows an image resulting from the projection transformation of the image of FIG. 3.

The image taken by a video camera represents a perspective view. The perspective road edge image as shown in FIG. 3 can be converted to non-perspective road edge image as shown in FIG. 4 according to the projection conversion process. The area between contiguous road edges is a permissible travelling area.

The permissible travelling area determining means 2 has a projection conversion characteristics set in consideration of the perspective projection characteristics of associated video cameras.

A wide angle video camera 12 and a telescope video camera 11 may be used in addition to an ordinary video camera, and these extra video cameras may be selectively used under the control of the permissible travelling area determining means 2. For example, the road edge which is determined from the images taken by the telescope video camera 11 shows the lost of linearity, and then the wide angle video camera 12 is selected to supply images of curved road. Contrary to this, the road edge which is determined from the images taken by the wide angle video camera 12 shows the presence of linearity, and then the telescope video camera 11 is selected to supply images of straight road.

After a permissible travelling area is determined by the permissible travelling area determining means 2, the target course setting means 3 will select a course most appropriate for running in the permissible travelling area, and will set the so selected course as a target course to follow.

Figure 5:
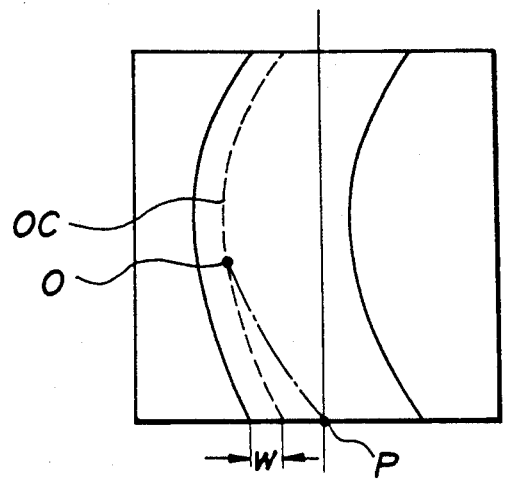
FIG. 5 shows one example of a target course set in the road.

Preferrably, the course may be determined in consideration of the road contour and the running speed of the vehicle to meet the instantaneous travelling condition of the vehicle. However, the course may be basically determined in consideration of the width of the road as follows:

In case that the target course setting means 3 finds that the width of the road is above a predetermined extent, and that vehicles must keep to the left, a target course OC will be set a given constant distance "W" (for instance, 1.5 meters) apart from the left edge of the road, as shown in FIG. 5.

In case that the width of the road is below the predetermined extent, a target course will be set along the center line of the road.

As the vehicle is running, the contents of the memories of the target course setting means 3 are renewed, and the coordinates of the target course are continuously stored therein. The divisions of the X-Y coordinates are selected in compliance with the magnification of the video camera.

In FIG. 5 the current or instantaneous vehicle position is indicated at "P", and the video camera may be placed so as to permit the point "P" to appear at the center, lower point of the display screen. The trace of the vehicle from "P" to "O" represents the course actually followed by the vehicle under the control of the control 4 until the vehicle has come to the target course at point 0.

Figure 6A:
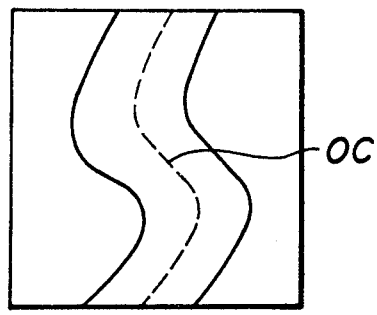
FIG. 6(a) shows one example of a target course set in the road for a vehicle running at a decreased speed.

Also, it is possible to set a target course in consideration of the running condition of the vehicle as follows:

In case that the target course setting means 3 finds that the running speed measured by the speed sensor 5 is below a predetermined speed, the target course will be set in conformity with the road contour as seen from FIG. 6a.

Figure 6B:
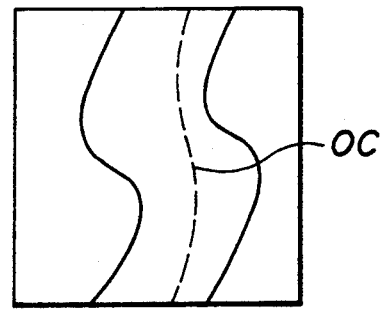
FIG. 6(b) shows one example of a target course set in the road for a vehicle running at an increased speed.
Figure 7:
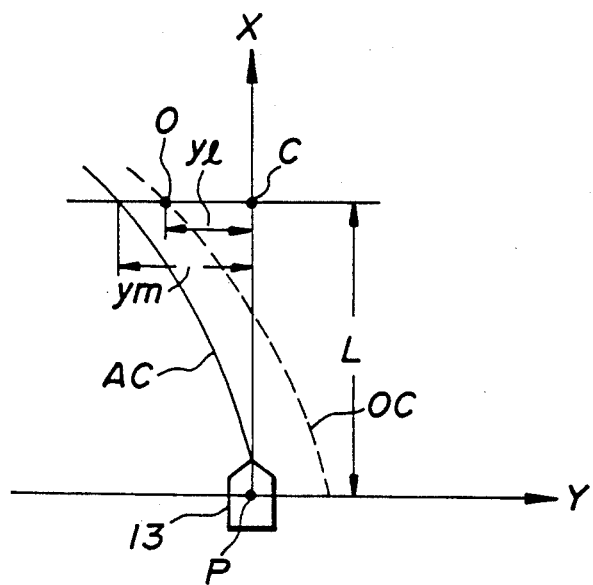
FIG. 7 shows the relation between a target course and a presumed course.

When the running speed of the vehicle is higher than a predetermined speed, and when the vehicle is running a curved road as shown in FIG. 6b, a target course of reduced curvature OC is set so as to reduce the lateral force which is applied to the vehicle.

After setting a target course in the road, the control 4 will estimate a steering amount to permit the vehicle to follow the target course as follows:

Assume that a vehicle 17 at Point "P" is controlled to get on the target course OC.

First, the distance L(m) (L=v×T) on the X-axis which the vehicle can run in T seconds will be determined on the basis of the running speed of the vehicle v (m/s), which is determined by the speed sensor. Then, the lateral deviation y1 from Point "C" (on which the vehicle would be in T seconds if it travelled straight along the X-axis) to the target course OC will be estimated.

Second, the course AC which the vehicle is supposed to follow, will be estimated from the yaw rate T (rad/sec). and then, the lateral deviation ym from Point "C" to the presumed course will be estimated by the following equation:

$$ym = (-v \times T^2/2) \times T \qquad (1)$$

The positive sign of yaw rate T represents that the presumed course turns to the left whereas the negative sign of yaw rate T represents that the presumed course turns to the right.

The yaw rate T' to which the yaw rate of the vehicle is to be corrected will be determined from the following equation:

$$\delta' = \delta + (T/v) \times W(1 + Kv^2) \qquad (3)$$

where "W" stands for wheelbase, "K" is a constant which is determined both from the tire characteristics and the vehicle characteristics.

The steering control 8 is responsive to the steering amount $\delta'$ from the control 4 for issuing a drive command to the steerage drive 9, thereby causing the steerage drive 9 to steer the vehicle towards the target course.

The setting of the distance L on the X-axis may vary with the running speed of the vehicle under the control of the control 4. In particular, the distance L on the X-axis may decrease with the decrease of the running speed v of the vehicle, accordingly reducing the distance which the vehicle runs before getting on the target course OC, causing the vehicle to get on the target course OC as quickly as possible.

In the case that the vehicle is running in a curved path, the distance L may decrease with the decrease of the curvature of the curved path, thereby causing the vehicle to get on the target course as quickly as possible.

A predetermined course pattern for a vehicle to follow from Point "P" to Point "O" on the target course may be advantageously used. This course pattern may be modified by a course factor which may be determined from the distance "L" and the running speed v to meet the particular situation. The vehicle can get on the target course smoothly by following the modified course pattern from Point "P" to Point "O" on the target course.

One example of the course pattern is given by y=x−sin x, and another example is given by y=x³.

Figure 8:
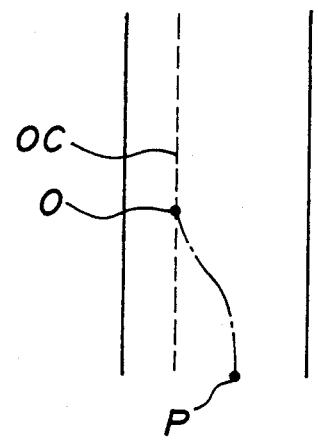
FIG. 8 shows one example of course which the vehicle follows when a vehicle puts itself on a target course.

FIG. 8 shows a course pattern represented by y=x−sin x.

The processes described above are repeated at every interval of several seconds to permit the vehicle to run along the target course automatically.

The target course setting means 3 sets a target course OC in repsonse to signals ND from a travelling system (See FIG. 11) informing a car for example, which way of a Y-branch the vehicle must take as follows:

Referring to FIG. 9, the vehicle is approaching to a Y-branch.

While the vehicle is running in an ordinary travelling area of relatively narrow width I in FIG. 9, a target course OC is set on the center line of the travelling area, as shown in FIG. 10(a).

In FIG. 9 each triangular area i (broken lines) indicates the area whose image can be taken by a video camera 1 of the vehicle 13.

When the vehicle is approaching to a Y-branch as indicated by II in FIG. 9, the travelling system having necessary travelling informations inputted therein, will send a command ND such as "Take the right way of the Y-branch appearing ahead of the car." to the target course setting means 3 at the time when the vehicle has come to Position A a predetermined distance apart from the Y-branch. According to the command from the travelling system the target course setting means 3 sets a target course OC gradually approaching from Position A to the right way as shown in FIG. 10(b). When the video camera catches the sight of the Y-branch ahead, the target course setting means 3 sets a target course OC extending in the right way of the Y-branch.

After the vehicle runs in the right way of the Y-branch, and after the vehicle enters an ordinary travelling area of relatively narrow width indicated at III in FIG. 9, the target course setting means 3 returns to the ordinary operation, setting a target course OC on the center line of the way.

The part (1) in FIG. 9 corresponds to FIG. 10(a); the part (2) in FIG. 9 corresponds to FIG. 10(b); the part (3) in FIG. 9 corresponds to FIG. 10(c) and the part (4) in FIG. 9 corresponds to FIG. 10(d).

FIG. 11 shows a travelling apparatus as comprising distance sensor 111, yaw rate sensor 112, signal processing unit 113, travel path storage unit 114, map storage medium 115, storage medium reader unit 116, display unit 117, and operating unit 118. A photoelectric distance measuring unit which is capable of generating a pulse signal per unit travelling distance in response to rotation of the tires of a vehicle, an electro magnetic type of distance measuring unit or a mechanical contact type of distance measuring unit may be used as a distance sensor 111. The yaw rate sensor 112 may comprise a gyroscope which is capable of generating a signal representing the angular velocity increment in the yaw direction while the vehicle is running. The signal processing unit 113 (computor-aided control) includes a CPU, ROMs for programming, RAMs for controlling etc. The CPU is capable of counting pulse signals from the distance sensor 111 to determine the travelling distance; determining the change of travelling direction from signals from the yaw rate sensor 112; estimating on the basis of these variables thus determined, the instantaneous position of the vehicle on the X-Y coordinates every time the vehicle has run a unit distance. The travel path storage unit 114 is capable of storing instantaneous car position data from the signal processing unit 113. The map storage medium 115 has digitalized map information stored in the form of files. The storage medium reader unit 116 selectively reads necessary map information from the map storage medium 115. The display unit 117 shows a map thus retrieved from the storage medium, and at the same time, the travel trace of the vehicle, the instantaneous position of the vehicle and the direction in which the vehicle is presumed to travel on the map. The operation unit 118 permits selection of map to be displayed, setting of the start position in the map appearing on the screen of the display unit, and inputting of selected commands from the travelling apparatus for guiding the vehicle along a target course. on the map.

As best seen from FIG. 12, a selected map appears on the screen of the display unit 117. In the map a first mark M1 indicates the instantaneous position of the vehicle on the X-Y coordinates (the instantaneous position on the X-Y coordinates being determined from the travelling distance from the start position times the reducing scale factor of the map); a second mark M2 indicates the direction in which the vehicle is going; and a series of third marks M3 indicate the trace of the vehicle.

When the operating unit 118 is operated to input travelling commands ND to the target course setting means 3 to permit the vehicle to follow a target course in the map appearing on the screen of the display unit, points a, b and c can be put in the map to indicate particular crossings or branches, and then commands such as "Turn to the left." or "Turn to the right" can be given when the vehicle is approaching such a point in the map.

The signal processing unit 113 reads each travelling command to issue an appropriate command ND for example, "Take the right way of the Y-branch appearing ahead of the vehicle." at the time when the instantaneous position mark M1 has come to be a given constant distance D apart to the point a.

It is not necessary to equip the travelling apparatus with a distance sensor 111 because the travelling distance can be determined from the speed sensor 5 of the automatic travelling apparatus shown in FIG. 1. Also, it is not necessary to equip the travelling apparatus with a yaw rate sensor 112 because the yaw rate sensor 6 of the automatic travelling apparatus shown in FIG. 1 can be commonly used.

As may be understood from the above, an automatic travelling apparatus according to the present invention is capable of finding out a permissible travelling area from images taken by a video camera to set a target course in the permissible travelling area; determining a steering amount appropriate for the purpose of permitting the vehicle to put itself on the target course, in consideration of the instantaneous travelling condition of the vehicle; and performing the exact steering control in terms of the steering amount. The exact travelling attained by the automatic travelling apparatus is attributable to two-step determination in which first, a target course is set in a permissible area, and a tentative course is set appropriate for the purpose of permitting the vehicle to put itself on the target course.

We claim:

1. An automatic travelling apparatus for a vehicle, comprising: an image pickup device attached to the vehicle; means for determining a permissible travelling area on the basis of an image taken by the image pickup device; means for setting a target course in the permissible travelling area thus determined; means for detecting the instantaneous running condition of the vehicle; means for estimating, on the basis of the instantaneous running condition, a steering amount to permit the vehicle to follow the target course; and means for steering the vehicle with reference to the steering amount.

2. An automatic travelling apparatus for a vehicle, comprising: an image pickup device attached to the vehicle; means for determining a permissible travelling area on the basis of an image taken by the image pickup device; means for determining the running speed of the vehicle; means for setting a target course in the permissible travelling area on the basis of the running speed of the vehicle; means for detecting the instantaneous running condition of the vehicle; means for estimating, on the basis of the instantaneous running condition, a steering amount to permit the vehicle to follow the target course; and means for steering the vehicle with reference to the steering amount.

3. An automatic travelling apparatus according to claim 2 wherein the instantaneous running condition of the vehicle is determined in terms of running speed, yaw rate and tire steering angle.

4. An automatic travelling apparatus according to claim 2 wherein a target course is set close to the left edge of a relatively wide road on which the bar is about to run, whereas a target course is set on the center of a relatively narrow road on which the car is about to run.

5. An automatic travelling apparatus according to claim 2 wherein the curvature of the target course increases with the decrease of the running speed of the vehicle, and vice versa.

6. An automatic travelling apparatus according to claim 1, wherein the instantaneous running condition of the vehicle is determined in terms of running speed, yaw rate and tire steering angle.

7. An automatic travelling apparatus according to claim 1 wherein a target course is set close to the left edge of a relatively wide road on which the car is about to run, whereas a target course is set on the center of a relatively narrow road on which the car is about to run.

8. An automatic travelling apparatus according to claim 1 wherein the curvature of the target course increases with the decrease of the running speed of the vehicle, and vice versa.

9. An automatic travelling method for a vehicle, comprising the steps of: taking an image of the extension of raod ahead of the vehicle; determining a permissible travelling area on the basis of the image thus taken; setting a target course in the permissible travelling area thus determined; detecting the instantaneous running condition of the vehicle; estimating, on the basis of the instantaneous running condition, a steering amount to permit the vehicle to follow the target course; and steering the vehicle with reference to the steering amount.

10. An automatic travelling method for a vehicle, comprising the steps of: taking an image of the extension of road ahead of the vehicle; determining a permissible travelling area on the basis of the image thus taken and the running speed of the vehicle; setting a target course in the permissible travelling area thus determined; detecting the instantaneous running condition of the vehicle; estimating, on the basis of the instantaneous running condition, a steering amount set to permit the vehicle to follow the target course; and steering the vehicle with reference to the steering amount.

11. An automatic vehicle control method comprising the steps of:

detecting an image of a road portion ahead of the vehicle;

determining a permissible travelling area on the basis of the image detected;

setting a target course in the permissible travelling area thus determined;

detecting the instantaneous running condition of the vehicle including determining running speed, yaw rate and tire steering angle;

estimating, on the basis of the instantaneous running condition, a steering amount to permit the vehicle to follow the target course; and steering the vehicle with reference to the steering amount.

* * * * *